(12) United States Patent
Ions et al.

(10) Patent No.: US 6,337,440 B1
(45) Date of Patent: Jan. 8, 2002

(54) RECOVERABLE ARTICLE

(76) Inventors: David Ions, 1 Coxs Road, Shrivenham, Wiltshire, SN6 8EL (GB); Philip Roland Winfield, Churchfield House, Latton, Swindon, Wiltshire, SN6 6DS (GB); Josef Toerringer, Sonnendorf 4, D-83128 Halfing (DE); George Gansbuehler, 4 Harptree Close, Nine Elms, Shaw, Swindon, Wiltshire, SN5 9UN (GB); Sean Michael Lewington, 9 Totterdown Close, Swindon, Wiltshire, SN3 5DT (GB); Philip Costigan, 41 Ravenscroft, Covingham, Swindon, SN3 5AE, Wiltshire (GB)

( * ) Notice: Subject to any disclaimer, the term of this patent is extended or adjusted under 35 U.S.C. 154(b) by 0 days.

(21) Appl. No.: 09/380,487

(22) PCT Filed: Mar. 18, 1998

(86) PCT No.: PCT/GB98/00824

§ 371 Date: Sep. 3, 1999

§ 102(e) Date: Sep. 3, 1999

(87) PCT Pub. No.: WO98/27632

PCT Pub. Date: Jun. 25, 1998

(30) Foreign Application Priority Data

Mar. 19, 1997 (GB) .............................. 9705692

(51) Int. Cl.[7] .............................................. H02G 15/18
(52) U.S. Cl. ...................... 174/74 A; 138/106
(58) Field of Search .............................. 174/73.1, 74 R, 174/74 A, DIG. 8; 428/188; 138/DIG. 5, 106, 113, 120, 128, 153, 155, 157, 173

(56) References Cited

U.S. PATENT DOCUMENTS 3,515,798 A 6/1970 Sievert
3,824,331 A 7/1974 Mixon, Jr. et al.
4,070,746 A 1/1978 Evans et al.
4,233,731 A 11/1980 Clabburn et al.
4,237,609 A 12/1980 Clabburn et al.
4,332,849 A 6/1982 Barkus et al.
4,410,009 A 10/1983 Blum
5,856,634 A 1/1999 Borgstrom
6,189,575 B1 * 2/2001 Ions et al. .................. 138/106

FOREIGN PATENT DOCUMENTS

| EP | 0435569 | 7/1991 | ......... H02G/15/184 |
| EP | 0530952 | 3/1993 | ........... B29C/61/06 |
| EP | 0590469 | 4/1994 | ........... B29C/61/06 |
| EP | 0683557 | 11/1995 | ......... H02G/15/184 |
| GB | 2018527 | 10/1979 | .......... H02G/15/08 |
| GB | 1556677 | 11/1979 | .......... H02G/15/08 |
| GB | WO 98/27632 | 6/1998 | .......... H02G/15/18 |

OTHER PUBLICATIONS

Derwent Abstract No. 94–110968/14 (abstract of EP 0,594, 469) No date.

Patent Abstracts of Japan, vol. 8, No. 20 (M–271) (abstract of JP 58–179634 (Sumitomo Electric), No date.#jf139##

*Primary Examiner*—Chau N. Nguyen
(74) *Attorney, Agent, or Firm*—Myers Bigel Sibley & Sajovec

(57) ABSTRACT

Recoverable articles including an inner resilient tubular member that is held in a laterally expanded configuration by engagement with an outer holdout member are provided. The outer surface of the inner member is provided with a plurality of channels extending therealong. The holdout member occupies the channels so as to provide the holdout engagement. The holdout engagement is arranged to be weakened mechanically without any substantial change in the molecular structural properties of the holdout member, thereby to allow recovery of the inner tubular member towards its unexpanded configuration.

27 Claims, 3 Drawing Sheets of a cable, for example on to a terminating lug or bushing connected to electrical equipment such as switchgear or a transformer. The termination may comprise an adapter, for example an elbow.

RECOVERABLE ARTICLE

BACKGROUND OF THE INVENTION

This invention relates to a recoverable article for, and method of, enclosing an elongate substrate. The substrate may comprise for example a cable, which may be an electrical power or telecommunications cable, and in particular a cable connection. The cable connection may comprise a joint, or splice, between two, or more, cables, or a termination of a cable, for example on to a terminating lug or bushing connected to electrical equipment such as switchgear or a transformer. The termination may comprise an adapter, for example an elbow.

The invention will be further particularly described with reference to an in-line joint between two electric power cables, but it is to be understood that this is by way of example only and not by way of limitation.

Joints between two power cables, whether either or both are polymeric or paper insulated cables, need to be enclosed within a protective arrangement that includes an electrically insulating layer. Heat shrink technology has been applied for this purpose for many years, with products available from Raychem and others. However, technologies that do not require heat are also employed. Push-on sleeves and elbows are available but unlike heat shrinkable products, these have severe range-taking limitations that necessitate a large inventory. Other so-called cold applied solutions require a tubular elastomeric sleeve to be radially expanded and mounted on a rigid holdout member, the internal diameter of which is larger than the maximum outer diameter of the cable joint to be enclosed. One example of the latter is the PST sleeve available from 3M, as exemplified in U.S. Pat. No. 3,515,798. Such a sleeve has an inner holdout member that consists of a continuous narrow strip of tough flexible material in the form of a rigid closed helix having adjacent coils interconnected. The held out sleeve is mounted over the cable joint and the helical strip is then unwound, thus allowing the insulating stretched elastic cover to shrink down onto the joint. However, it is inconvenient having to unwind the holdout strip helically around, the extended cable, especially if the work has to be done in the confined space of a trench or manhole. Another example of a cold applied arrangement is disclosed in U.S. Pat. No. 3,824,331 (AMP), in which a resilient tubular cover is supported in a stretched condition by an easily removable external one piece support member, each end of the cover being rolled back over the outside of the support. The cover and support member are mounted on an internal sleeve in the form of a longitudinally slit tube held in a state of increased diameter by a dividing strip in the shape of an I-beam. When in position over the cable joint, removal of the dividing strip longitudinally from the slit allows the inner tube to be squeezed and then freely withdrawn from the cover. The cover ends are then unrolled onto the adjacent cable sections and the external support member is removed. It will be appreciated that such an arrangement requires an inner and an outer holdout member, each of which has to be removed. EP-B-O 530 952 (3M) discloses a cover assembly in which an elastomeric tube is held out in a stretched condition on an inner support core. The core is frangible such that application thereto of a force beyond that produced by the tube causes breakage of the core so as to allow contraction of the elastomeric tube onto the substrate. The fragments of the collapsed core remain within the tube and must therefore be as small as possible to facilitate accommodation therewithin.

With each of these arrangements, the holdout member is disposed internally of the sleeve that is to be applied to the substrate cable. Thus, the sleeve cannot conveniently have an internal coating, of gel, mastic or adhesive for example, applied thereto. This problem, is avoided by the recoverable sleeve assembly disclosed in U.S. Pat. No. 4,410,009 (Sigmaform), in which an inner elastomeric tube is maintained in a radially-stretched condition by having an outer rigid tube surrounding and secured to the outer surface thereof. The outer tube is a rigid thermosetting adhesive polyurethane whereby the outer tube is sufficiently adhesive to hold the inner tube in its stretched condition but will peel from the inner tube upon impact of force. U.S. Pat. No. 4,070,746 (Raychem) discloses a recoverable tubular article in which an elastomeric sleeve is retained in a radially expanded condition by an outer constraint that is bonded thereto. The restraint is sufficiently strong to retain the sleeve in its expanded form under ordinary conditions of storage, but is susceptible to attack by solvents that weaken the bond sufficiently to allow the elastomeric sleeve to peel away from the restraint and to recover towards its original state. U.S. Pat. No. 4,233,731 (Raychem) discloses a dimensionally-recoverable article comprising a hollow resilient member which has been expanded to a dimensionally unstable configuration in which it is retained by a keeper positioned between and separating two parts of the hollow member away from the path of recovery thereof. The keeper is made from a material that weakens or changes its shape upon heating and/or chemical treatment, for example by being chemically degradable when subjected to a solvent. In one embodiment a single wedge of fusible material is interposed in the break in the circumference of a split tube of beryllium copper alloy. In another embodiment a tubular member made from an engineering plastics material has dovetailed protuberances on its outer surface between which strips of a polycarbonate are inserted to maintain the expanded configuration. EP-A0590469 (Kabelmetal) discloses a recoverable elastomeric tubular article that is held in its expanded state by thermoplastic bracing means in the form of a profile applied helically to the outer surface of the expanded tube.

SUMMARY OF THE INVENTION

It is an object of the present invention to provide a recoverable article and its method of manufacture, in which the article is held out in its expanded configuration by an advantageous external holdout means so as not to interfere with any inner layer, of gel, adhesive or mastic material for example, which may be applied internally thereof as a coating or which may be located around the substrate to be enclosed.

Thus, in accordance with one aspect of the present invention, there is provided a recoverable article comprising an inner resilient tubular member that is held out in a laterally expanded configuration by engagement with an outer holdout means, wherein the outer surface of the inner member is provided with a plurality of channels extending therealong and the holdout means occupies the channels so as to provide said holdout engagement, wherein the holdout engagement is arranged to be weakened mechanically without any substantial change in the molecular structural properties of the holdout means, thereby to allow recovery of the inner tubular member towards its unexpanded configuration.

Preferably, the mechanical weakening of the holdout engagement is effected by a change in shape of the holdout means.

The article of the present invention is thus arranged to recover by mechanical weakening that does not involve the application of heat or a chemical treatment, including the application of a solvent, with the advantage of simplification of installation on a substrate.

Preferably, the holdout means comprises a plurality of strips that are disposed as a tight fit in respective ones of the channels. Each strip may comprise a plurality of longitudinally spaced-apart holdout members that substantially fill its cavity at discrete positions along its length, successive holdout members of each strip being linked together. The holdout members may be integral with the links therebetween, and may be of a high modulus polymeric material. Alternatively, the links, which may be provided by a continuous backing layer for example, may be formed from an elastomeric layer and the discrete holdout members may be of a high modulus material. Preferably, however, each strip may substantially fill its channel at every point along its length, for example as by having a substantially uniform cross section therealong.

In embodiments in which the holdout means comprises a plurality of strips, the article may include one or more (preferably two) supports, for example in the form of rings, to retain the tubular member (preferably via the holdout strips), in a substantially circular cross-sectional configuration. The or each support is preferably located radially inwards of the holdout strips and/or the tubular member. The or each support may be located adjacent to an end of the tubular member, preferably exterior to the tubular member.

Each strip of the holdout means may comprise two parts such that (a) when the two parts engage one another, the integrity of the holdout means is maintained, and (b) when one of the two parts is released from the other part that is in engagement with the channel, the other part is arranged to change its shape thereby to facilitate weakening of the holdout engagement. The change of shape of the inner part may be effected by a pivoting movement thereof In one embodiment, the holdout means may comprise a plurality of high modulus material strips engaging respective channels of the castellated outer surface of the inner member, each strip being encased within a lower modulus sheath that retains a lubricant. Release of the holdout may be effected by slitting the outer sheaths from one end to the other so that the lubricant facilitates the recovery force of the inner member urging the strips out of the channels. The slitting may be effected by an annular ring with inwardly projecting cutting surfaces for engaging respective holdout strips.

In a further embodiment the holdout may be formed by a layer extending around the entire circumference of the inner member and bonded thereto so as to extend over the top of the cavities. In its holdout configuration, the layer may be deflected into the cavities, and may be flipped outwards, for example progressively from one end of the article to the other, so as to hinge to a configuration that allows recovery of the article.

Advantageously, the channels in the outer surface of the resilient inner member are formed by it having a castellated configuration.

Advantageously, the cavities, for example the longitudinal channels, in the outer surface of the inner member are re-entrant so as to enhance retention of the holdout means.

It will be appreciated that the shaping of the cavities has to be such as to ensure that the inner member is retained in its expanded configuration under expected conditions of storage and transport to its place of application and then to be released without the need for undue force, preferably manually, when the article is to be applied to a substrate. The shaping of the interface between the inner member and the holdout means will thus depend on factors such as (i) the material of the inner tubular member and of the holdout means, in particular the relative hardness, and (ii) the force within the expanded tubular member tending to cause it to recover, which will itself depend on the material, the expansion ratio of the member, and its thickness. Thus, for example a thickwalled inner member made of highly expanded, relatively high modulus material would require a relatively greater amount of mechanical interlocking by the holdout means due to its relatively high recovery forces.

The inner member is preferably made from polymeric, preferably elastomeric material.

One or both ends of the inner tubular member may advantageously have a bevelled (especially chamfered) internal surface. This can help to prevent the end of the tubular member digging into a substrate (e.g. a cable) around which it is recovered.

The inner member may form part of an enclosure for an electric cable splice, termination, or the like, and may be formed from electrically conductive material, for example for forming electrical continuity across, and/or electrical screening of, the joint. The inner tubular member may have one, or more, further layers on its inner surface, which may be co-extruded therewith. For example, an electrically insulating layer and/or an electrically stress grading polymeric layer may be co-extruded internally with the inner member. Such an additional layer may have different mechanical properties from the inner member, for example by being more resilient so as to enhance conformity with the substrate, for example a cable splice. There may also be an innermost electrically conductive layer, for example extending along only part of the length of the other layer(s), to provide a Faraday cage. An inner layer of gel, mastic or adhesive may be provided to enhance conformability and sealing, for example to exclude air and/or moisture, with the substrate. It is also envisaged that such a sealant layer may be applied separately to the substrate.

In accordance with another aspect of the present invention, there is provided a substrate, for example a cable joint, termination or elbow, enclosed by a recovered article in accordance with the said one aspect of the present invention.

The holdout means may be applied in a flowable form, such as sand or other granular material, and held in place by a wrapping, of polymeric or other suitable material. The flowable material may be a hardenable, or curable, material, such as plaster of paris, cement, a curable epoxy resin system or other thermoset, which may or may not require a wrapping.

In general, however, whether or not the holdout means is flowable, it may be desirable to enclose the article of the invention within an outer sheath to enhance retention of the holdout means during storage and transport.

The holdout means may comprise foam, preferably high density foam, which may be formed in strips to fit channels in the outer surface of the inner member for example, or which may be foamed in situ to fill the expanded cavities.

The holdout means may be formed, especially when of strip configuration, of material that exhibits good resistance to compression in the transverse direction, whilst exhibiting more flexibility, or brittleness, in the longitudinal direction of the inner member, thereby to facilitate controlled removal thereof, and thus controlled recovery of the inner member. Cardboard has been found to be a suitable material, for example a material comprising composite layers of Kraft board approximately 0.9 mm thick. Wooden laths, fibre board or plasterboard are also suitable materials. In the latter case, a board comprising a layer of plaster 9 mm thick laminated between layers of cardboard giving an overall thickness of about 10 mm has been found suitable. Such holdout means are comparatively cheap and are also biodegradable. It is also envisaged, however, that the holdout means of the article of the invention may be polymeric, preferably biodegradable.

The holdout means may be extruded on to the outer surface of the inner tubular member.

In accordance with a further aspect of the present invention, there is provided an elongate substrate, which may comprise an electrical component, for example an electric cable splice, termination or elbow, enclosed by a recovered article in accordance with the said one aspect of the invention, in which the holdout means is peeled away from the inner member from one end to the other.

BRIEF DESCRIPTION OF THE DRAWINGS

Recoverable articles, each in accordance with the present invention, will now be described, by way of example, with reference to the accompanying drawings, in which.

DETAILED DESCRIPTION OF THE INVENTION

Figure 1:
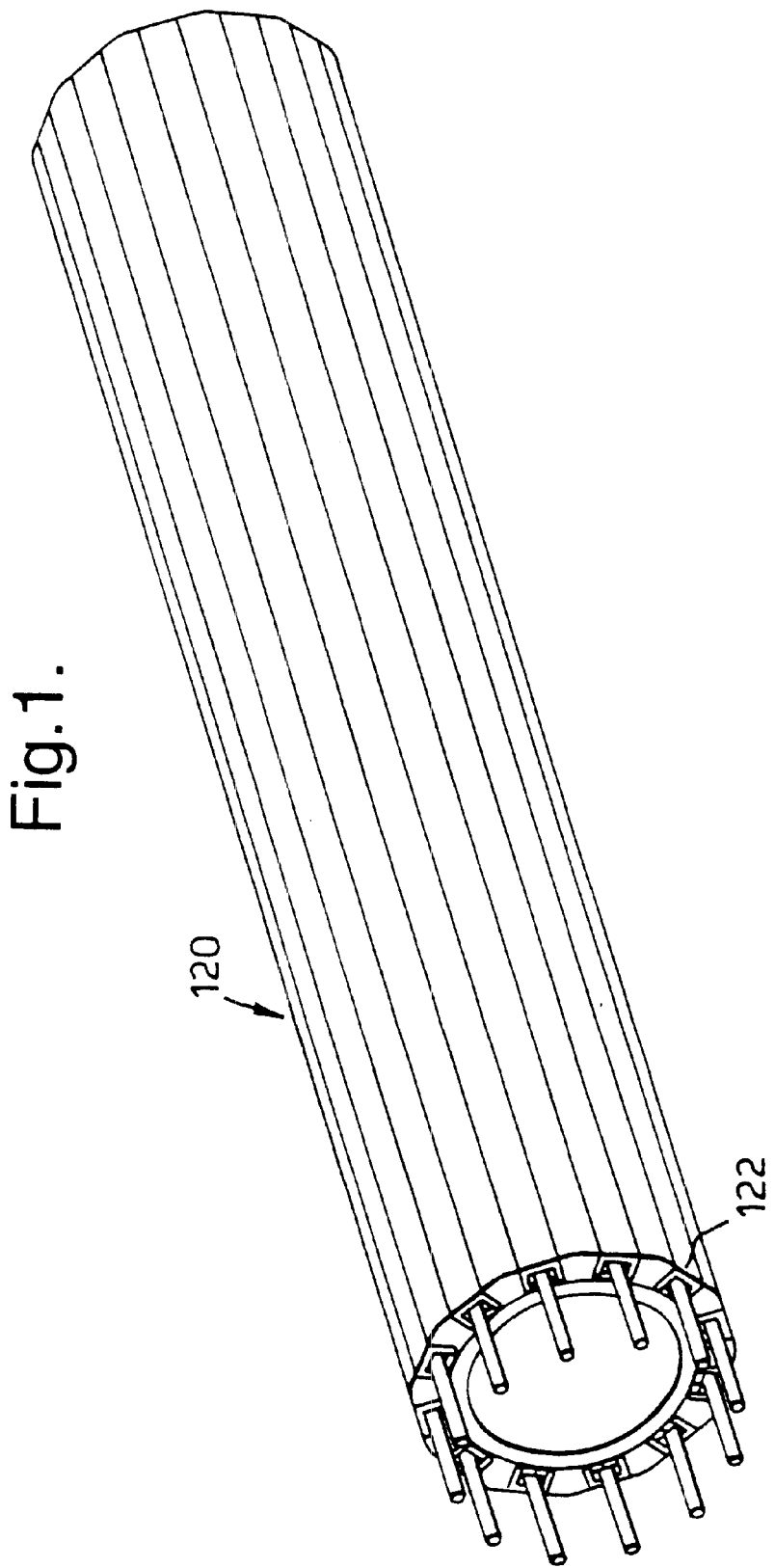
FIG. 1 is an isometric view of one embodiment of recoverable article.
Figure 2:
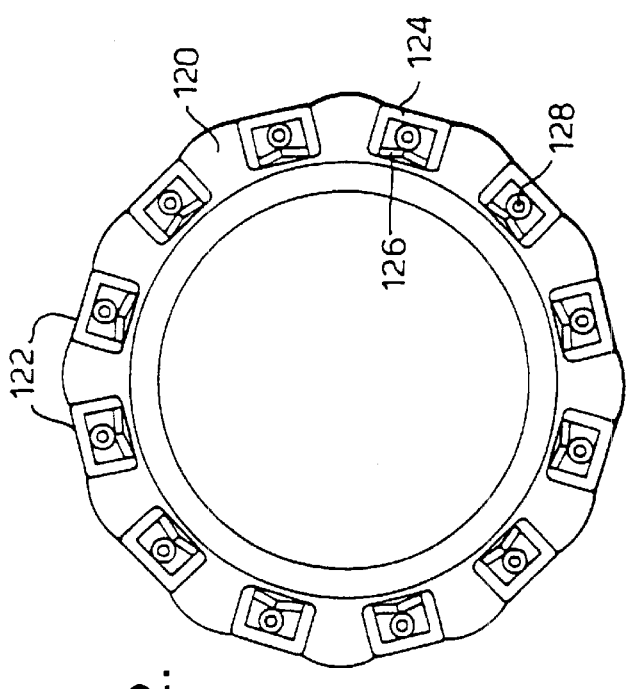
FIG. 2 is an end view of the article of FIG. 1.

FIGS. 1 and 2 show a recoverable article in which an inner resilient member 120 has a longitudinally castellated outer surface, each of the twelve channels of the castellation being filled with a holdout strip 122. Each strip 122 consists of a generally hollow rectangular outer portion 124, that has a collapsible or weakened inner wall 126, which is held out by an internal rigid tube 128 along its length. As the twelve tubes 128 are withdrawn longitudinally, radial recovering of the expanded article 120 tends to result in a reduction in its circumference so that lateral forces are exerted on the side walls of the holdout portions 124. These forces cause the weakened inner walls 126 to fold inwardly without fracturing, and the portions 124 are ejected from the castellation channels thus allowing the member 120 to recover towards its unexpanded diameter, being restricted from achieving full recovery by conforming engagement with the substrate (not shown).

Figure 3:
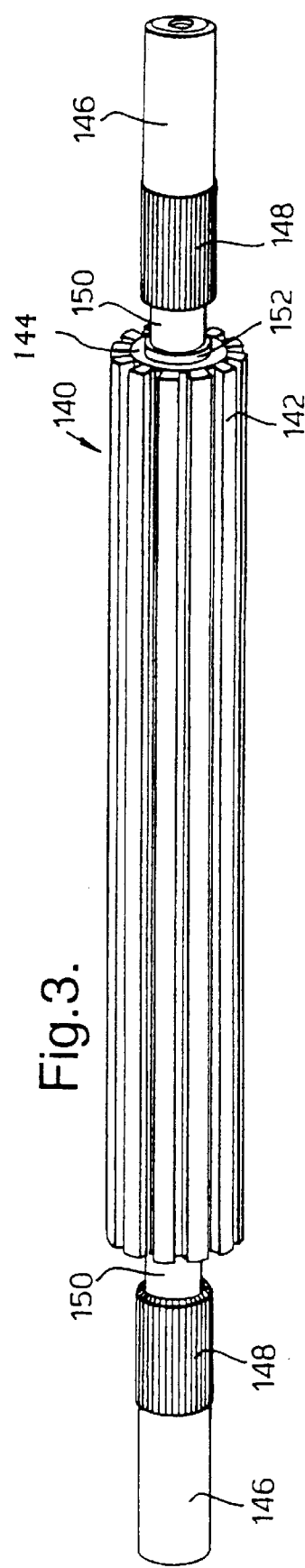
FIG. 3 is an isometric view of the article of FIGS. 1 and 2 forming part of an in-line power cable splice.

FIG. 3 shows an article 140 in accordance with the preceding embodiment, in its recovered condition on an in-line electric power cable splice. The article 140 consists of a castellated electrically conductive resilient member 142 and an innermost layer 144 of polymeric electrically insulating material. Each cable has an outer polymeric jacket 146, folded back earth screen wires 148, and primary dielectric 150. Prior to the recovery of the article 140, the region around the connector of the cable conductors (not shown) has been enclosed within a layer 152 of stress controlling material, that has been compressed into conformity with the underlying components by the recovery of the article 140, thereby excluding air from the splice region. Although not shown, it will be understood that an outer protective jacket is to be applied to the splice as shown in FIG. 3 so as to encompass the article 140 and to seal on to each cable jacket 146. Electrical continuity across the joint, via the conductive layer 142, between the cable wires 148 will also be made. Advantageously, the outer protection jacket is as disclosed in British Patent Application No. 9626364.5.

Figure 4:
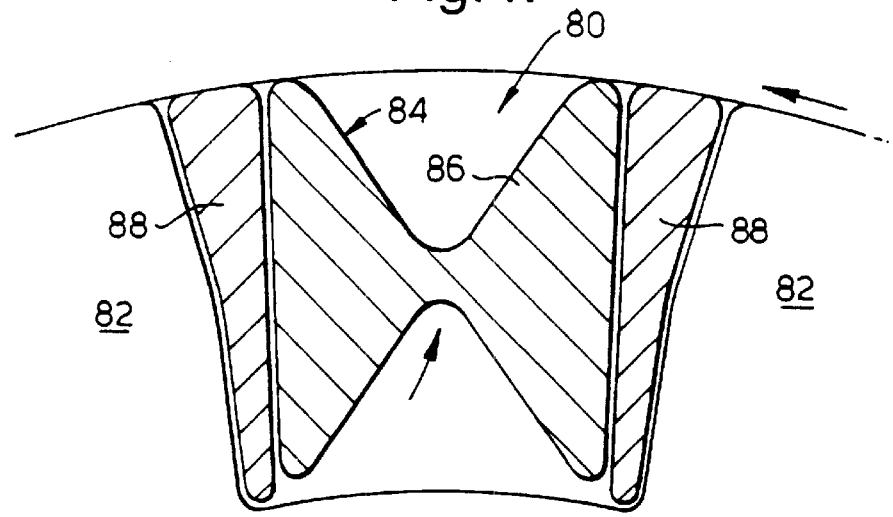
FIGS. 4 and 5 are partial end views of further embodiments of recoverable article.

FIG. 4 shows an end view of a segment of a further embodiment of the recoverable article in which a channel 80 between adjacent lands 82 of the outer surface of a resilient inner member is filled by a two-part elongate holdout strip 84. A central support part 86 of the strip 84 is of general-H shape with the narrow intermediate bridging portion forming a hinge. The other part of the holdout strip 84 consists of a pair of side strips 88 that act to provide a lower friction interface with the central part 86 than the part 86 would have with the sides of the lands 82.

Figure 5:
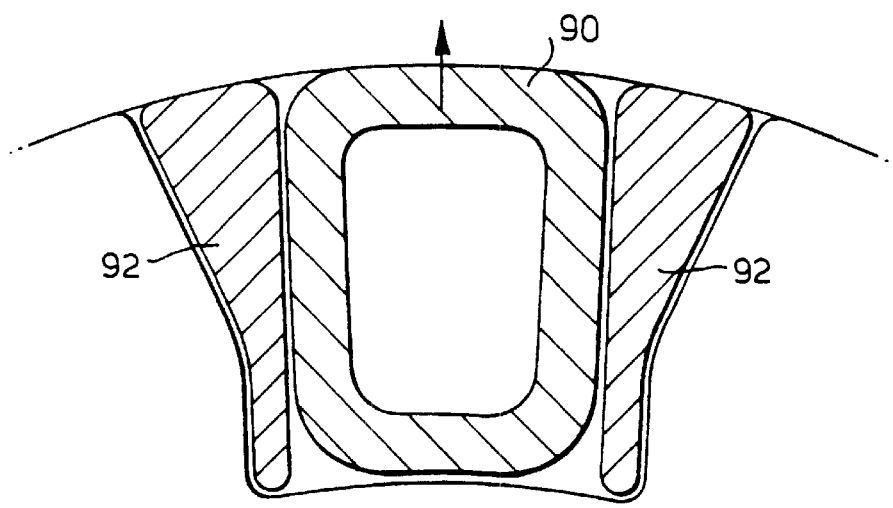

FIG. 5 shows a modification of the article of FIG. 4, in that the central support part 90 is of general hollow rectangular shape with external corners radiussed, and side strips 92 are wedge-shaped to conform to the correspondingly-shaped side walls of the channel of the castellated inner member, and to enhance retention of the holdout part 90 therein.

In a further embodiment, the reduction in friction achieved by employing side pieces of a holdout, such as the side strips 88 or 92, may alternatively be achieved by spray coating the sides of the channels of the inner member or the holdout part 84, 90 with a low friction material, or by applying a grease thereto.

Figure 6:
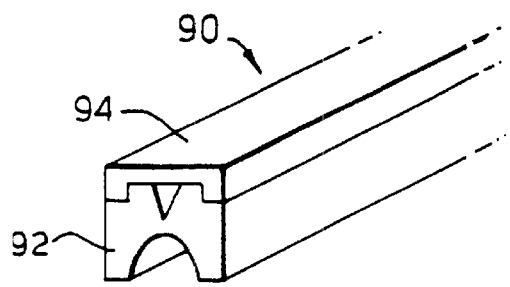
FIG. 6 is an isometric view of part of a still further embodiment of holdout strip.

Referring to FIG. 6, the extruded polymeric holdout strip 90 is in two parts, a generally H-shaped part 92 that is arranged to engage the channel of the expanded castellated inner member, and an external snap-on cover 94. The H-shape of the part 92 allows the strip 90 to act as a hinge when the retaining outer cover 94 is removed. Thus, removal of the cover 94, by a peeling action from one end to the other, results in the circumferential recovery within the inner resilient member, such as the member of FIG. 1, exerting pressure on the radially inner legs of the part 92, which then hinges inwardly about is cross member so that the part 92 is urged out of its channel without fracturing.

In an alternative arrangement, the outer part of a two-part holdout as exemplified in FIG. 6, that is to say the snap-on cover part 94, may be slit axially along its length, along the V-shape in the upper (outer) part of the H of the inner part 92. By fracturing the outer part, the inner part is released, and changes its shape, as before, and is ejected from the channel of the inner resilient member.

What is claimed is:

1. A recoverable article, comprising an inner resilient tubular member that is held out in a laterally expanded configuration by engagement with an outer holdout means, wherein the outer surface of the inner member is provided with a plurality of channels extending therealong and the holdout means occupies the channels so as to provide said holdout engagement, wherein the holdout engagement is arranged to be weakened mechanically without fracturing and without any substantial change in the molecular structural properties of the holdout means, thereby to allow recovery of the inner tubular member towards its unexpanded configuration and wherein the mechanical weakening of the holdout engagement is effected by a change in shape of the holdout means.

2. An article according to claim 1, wherein the holdout means comprises a plurality of strips that are disposed as a tight fit in respective ones of the channels.

3. An article according to claim 2, wherein each strip substantially fills its channel at every point along its length.

4. An article according to claim 3, wherein each strip comprises two parts such that (a) when the two parts engage one another, the integrity of the holdout means is maintained, and (b) when one of the two parts is released from the other part that is in engagement with the channel, the other part is arranged to change its shape thereby to facilitate weakening of the holdout engagement.

5. An article according to claim 4, wherein the change of shape of the other part is effected by a pivoting movement thereof.

6. An article according to claim 4, wherein the one part comprises an interlocking cover for the other part.

7. An article according to claim 4, wherein the two parts of the strip are integral with each other.

8. An article according to claim 4, wherein the two parts are hinged together.

9. An article according to claim 4, wherein said one part is inserted within the other part thereby to prevent weakening thereof.

10. An article according to claim 1, wherein the channels are formed by the outer surface of the inner member being of castellated configuration.

11. An article according to claim 1, wherein the channels are re-entrant, thereby to enhance retention of the holdout means.

12. An article according to claim 1, comprising release means arranged to weaken the holdout means of all the channels substantially simultaneously.

13. An article according to claim 1, wherein the plurality of channels extend longitudinally of the article, parallel to one another.

14. An article according to claim 1, wherein the holdout means comprises: (a) a particulate material; or (b) a cured material; or (c) high density foam material; or (d) compacted fibrous material; said material being retained in place by an enveloping cover.

15. An article according to claim 1, wherein the holdout means comprises form-stable bio-degradable material.

16. An article according to claim 1, wherein the inner tubular member is electrically conductive.

17. An article according to claim 1, wherein the inner tubular member is made from polymeric elastomeric material.

18. An article according to claim 1, comprising an additional, radially inner, resilient tubular arrangement on which the inner tubular member is mounted integrally therewith.

19. An article according to claim 18, wherein the additional tubular arrangement comprises at least one tubular member that is more resilient Man the inner resilient tubular member.

20. An article according to claim 18, wherein the additional tubular arrangement comprises an electrically insulating tubular member or an electrically stress-controlling tubular member.

21. An article according to claim 18, wherein the additional tubular arrangement is made from polymeric material.

22. An article according to claim 18, comprising an innermost electrically conductive layer radially inwards of the additional tubular arrangement, and located only in a longitudinally central region of the article so as to provide a Faraday cage.

23. An article according to claim 1 of substantially right-cylindrical configuration.

24. A recoverable comprising an inner resilient tubular member that is held out in a laterally expanded configuration by engagement with an outer holdout means, wherein the outer surface of the inner member is provided with a plurality of channels extending therealong and the holdout means occupies the channels so as to provide said holdout engagement, wherein the holdout engagement is arranged to be weakened mechanically without any substantial change in the molecular structural properties of the holdout engagement thereby to allow recovery of the inner tubular member towards its unexpanded configuration; and wherein the holdout means comprises a plurality of strips that are disposed as a tight fit in respective ones of the channels, the strips being hollow at lea at their end regions, and release means for engaging within the strips so as to cause them to change shape and to be released from the channels.

25. A recoverable article comprising;

an inner resilient tubular member including a plurality of channels extending along an outer surface thereof; and an outer holdout member positioned in the channels and engaging the outer surface of the inner resilient tubular member to hold the inner resilient tubular member in a laterally expanded configuration, wherein the outer holdout member has a first shape supporting the inner resilient tubular member in its expanded configuration and a second shape allowing recovery of the inner tubular member towards its unexpanded configuration, the outer holdout member being configured to change from its first shape to its second shape by being weakened mechanically without fracturing and without any substantial change in the molecular structural properties of the outer holdout member.

26. A recoverable article comprising:

an inner resilient tubular member including a plurality of channels extending along an outer surface thereof;

a plurality of strips positioned in respective ones of the channels and engaging the outer surface of the inner resilient tubular member to hold the inner resilient tubular member in a laterally expanded configuration, the plurality of strips being configured to be weakened mechanically without any substantial change in the molecular structural properties of the plurality of strips to allow recovery of the inner resilient tubular member to its unexpanded configuration; and wherein ones of the plurality of strips further comprise a first part and a second part positioned in a respective one of the channels so as to engage each other, the first part having a first shape when in engagement with the second part and a second shape when the second part is removed from the respective one of the channels, the second shape weakening the ones of the plurality of strips mechanically to allow recovery of the inner resilient tubular member to its unexpanded configuration.

27. A recoverable article comprising:

an inner resilient tubular member including a plurality of channels extending along an outer surface thereof;

a plurality of strips being hollow at least at their end regions positioned in respective ones of the channels and engaging the outer surface of the inner resilient tubular member to hold the inner resilient tubular member in a laterally expanded configuration, the plurality of strips being configured to be weakened mechanically to allow recovery of the inner resilient tubular member to its unexpanded configuration; and at least one release member removably engaging ones of the plurality of strips, the ones of the plurality of strips having a first shape when in engagement with the at least one release member and a second shape when the at least one release member is removed from engagement with the ones of the plurality of strips, the second shape weakening the ones of the plurality of strips mechanically to allow recovery of the inner resilient tubular member to its unexpanded configuration.

* * * * *